Patented Apr. 22, 1947

2,419,516

UNITED STATES PATENT OFFICE 2,419,516

DIALKYL-DIHYDROXY-DIPHENYL-HEXA-DIENES AND THEIR DERIVATIVES

Albert Bloom, Clinton, N. J., and Victor Niederl, Brooklyn, N. Y., assignors to Reed & Carnrick, Jersey City, N. J., a corporation of New Jersey No Drawing. Application February 26, 1944, Serial No. 524,090

1 Claim. (Cl. 260—619)

The present invention relates to a dialkyl-dihydroxy-diphenyl-hexadiene, its hydrogenation products and their esterification products.

It is an object of this invention to provide a number of novel oestrogenic compounds of high oestrogenic activity and very low toxicity.

It is a special object of the invention to provide novel oestrogenic compounds, which due to their high oestrogenic activity and very low toxicity, may be used in effective dosages.

Other objects of this invention will be clear from the more detailed disclosures which follow:

The preparation of the dialkyl-diacidyloxy-diphenyl-hexadienes, such as dialkyl-diacetoxy-diphenyl-hexadiene, from which the other compounds of this invention may be prepared, can be considered to take place in four steps, although certain of these steps may be advantageously combined under favorable circumstances. In the first step of the process a suitable alkyl phenol, such as one of the various methyl, ethyl and propyl phenols, is condensed with a propionic acid halide to produce an alkylphenyl propionate. In the second step this propionate is subjected to molecular rearrangement to produce an alkylhydroxy propiophenone. In the third step two mols of this ketone are condensed to produce 3:4-bis-(alkylhydroxyphenyl)-3:4-dihydroxy hexane. In the fourth step this compound is treated with an acidyl chloride and an appropriate carbonyl anhydride to yield a bis-(alkylacidyloxyphenyl)-2:4 hexadiene. Hydrolysis with dilute alkali produces 3:4-bis-(alkylhydroxyphenyl)-2:4-hexadiene. This bis-(alkylhydroxyphenyl)-2:4-hexadiene may be converted into the corresponding di-ester by condensation with organic acids or their anhydrides. By catalytic hydrogenation of the 3:4-bis-(alkylacidyloxyphenyl)-2:4-hexadiene the respective saturated compounds are prepared, from which the dihydroxy compound and the esters may be obtained by the same method as already described. The foregoing dialkyl-dihydroxy-diphenyl-hexadienes, dialkyl-dihydroxy-diphenyl-hexanes and their various esters are referred to collectively herein as a dialkyl-dihydroxy-diphenyl-hexadiene, its hydrogenation products and their esterification products.

It should be understood that the fourth step of the preceding reaction can be carried out, under appropriate conditions, with the acids themselves or their halides. If the halides are utilized the alkali metal salts of the alkyl-hydroxyphenyl compounds are used. When the acids are used per se water binding agents are necessary.

The following examples disclose the production of a dimethyl-diacetoxydiphenyl hexadiene, a dimethyldihydroxydiphenyl hexadiene, a dimethyldipropionyloxydiphenyl hexadiene, a dimethyldihydroxydiphenyl hexane, a dimethyldiacetoxydiphenyl hexane, and a dimethyldipropionyloxydiphenyl hexane, as prepared from alkylated phenols, such as, o-cresol. Other o-alkylated phenols including ethylphenols, propylphenols, butylphenols and the like, may be used in a similar manner. Likewise, other fatty acid esters including those derived from butyric acid and other higher acids may be formed either through esterification or through a utilization of other acids in the fourth step of the condensation.

Example 1

(a) Molar quantities of o-cresol and propionyl chloride are allowed to react in a suitable container, yielding, with the elimination of hydrochloric acid, the o-methylphenyl propionate in a quantitative yield. The crude material may be used for the next step without further purification.

(b) Thirty grams of o-methylphenyl propionate is dissolved in 100 milliliters of dry nitrobenzene and chilled in an ice bath; 35 grams of aluminum chloride is added in small portions, and the reaction mixture is kept cold during the addition of aluminum chloride, after which it is left standing in an ice bath for several hours and then at room temperature over night. Thereafter, the reaction mixture is decomposed with ice water, a few milliliters of hydrochloric acid are added and the reaction mixture is extracted with ether. The ether solution is washed with water and then extracted with 10% sodium hydroxide solution. Finely crushed ice is added to this solution, and then acidified with hydrochloric acid. The precipitate formed is collected and subjected to steam distillation to remove the ortho isomer. Yield: 24 grams. This 3-methyl-4-hydroxyphenylpropiophenone may be used for the next reaction without further purification.

(c) Twenty grams of the above ketone is added to 40 grams of amalgamated aluminum foil covered with 1 liter of moist ether and refluxed for several hours. After standing over night the reaction mixture is filtered and the solid material remaining is well washed with ether. The ether is removed from the filtrate by distillation, and the residue is treated with 5 milliliters of glacial acetic acid. After standing in the refrigerator for several days the precipitate formed is collected and washed with a small portion of cold acetic acid. The crystalline 3:4-bis-(3-methyl-4-hydroxyphenyl)-3:4-dihydroxy hexane after recrystallization from ethyl alcohol melts at 182–183° C. Yield: 9 grams.

(d) Five grams of the above glycol is suspended in 15 milliliters of acetic acid anhydride, and 10 milliliters of acetyl chloride is added. The flask is placed in a water bath which is gradually heated to 70° C., and heating at this temperature is continued for about 20 minutes. The flask is chilled and the reaction mixture is decomposed with finely crushed ice. The precipitate obtained is recrystallized from ethyl alcohol and then has a melting point of 166–168° C. Yield of 3:4-bis-(3-methyl-4 acetoxyphenyl)-2:4-hexadiene is 4 grams.

Example 2

One gram of 3:4-bis-(3-methyl-4-acetoxyphenyl)-2:4-hexadiene is placed in a 50 milliliter evaporating dish, and 10 milliliters of Claisen solution (50% potassium hydroxide diluted with an equal volume of methyl alcohol) is added. This solution is warmed on a water bath at a temperature not exceeding 50° C. until the solid material has dissolved, and then it is left standing at room temperature for 24 hours. This solution is diluted with 40 milliliters of distilled water, filtered and gradually acidified with 10% hydrochloric acid to Congo red. The precipitate solidifies after standing in the refrigerator for several hours, it is filtered off, washed with distilled water and placed on porous tile to dry. After recrystallization from 50% ethyl alcohol the 3:4-bis-(3-methyl-4-hydroxyphenyl)-2:4-hexadiene melted at 187–189° C.

Example 3

One gram of 3:4-bis-(3-methyl-4-hydroxyphenyl)-2:4-hexadiene is dissolved in 20 milliliters of propionic acid anhydride and gently refluxed for 30 minutes. The solution is allowed to cool, and then is poured into an Erlenmeyer flask containing finely cracked ice. The flask is shaken until a precipitate is formed, after which more ice is added and the reaction mixture is left standing for 24 hours to permit complete hydrolysis of the excess propionic anhydride and to allow the precipitate to solidify. The 3:4-bis-(3-methyl-4-propionyloxyphenyl)-2:4-hexadiene may be recrystallized from ethyl acetate and melts at 180° C.

Other esters may be formed in a similar manner.

Example 4

Two grams of 3:4-bis-(3-methyl-4-acetoxyphenyl)-2:4-hexadiene is dissolved in 200 milliliters of hot ethyl alcohol and subjected to hydrogenation at 70° C. and 1000 lbs. pressure for two hours in the presence of a suitable catalyst, such as a nickel or platinum catalyst. Then this solution is filtered to remove the catalyst and concentrated to a volume of 50 milliliters by distilling off the ethyl alcohol. The concentrate is placed in a refrigerator over night and then the material crystallizing out is filtered off and dried on porous tile. This material, 3:4-bis-(3-methyl-4-acetoxyphenyl)-hexane melts at 132° C.

Example 5

One gram of 3:4-bis-(3-methyl-4-acetoxyphenyl)-hexane is dissolved in 10 milliliters of Claisen solution and warmed on the water bath at about 50° C. until it has completely dissolved. After standing at room temperature for 24 hours this solution is diluted with 40 milliliters of distilled water, filtered and then gradually acidified with 10% hydrochloric acid to Congo red. The precipitate is allowed to solidify completely by adding crushed ice. When solid, it is filtered off and placed on porous tile to dry. The 3:4-bis-(3-methyl-4-hydroxyphenyl)-hexane is recrystallized from 50% ethyl alcohol and melts at 180° C.

Example 6

One gram of the 3:4-bis-(3-methyl-4-hydroxyphenyl)-hexane is dissolved in 20 milliliters of propionic acid anhydride and gently refluxed for 30 minutes. The solution is allowed to cool and is poured into a vessel containing finely crushed ice. The vessel is shaken until a precipitate is obtained; then more ice is added and the solution is left standing for 24 hours to permit complete solidification of the precipitate which then is filtered off and placed on porous tile to dry. The 3:4-bis-(3-methyl-4-propionyloxyphenyl)-hexane is recrystallized from ethyl acetate.

We have found that the oestrogenic compounds of the preceding examples can be administered, without observable toxic effects, in doses which exceed many times the effective oestrogenic doses. Moreover, we have found that certain of the derivatives of the initially prepared 3:4-bis-(3-methyl-4-acetoxyphenyl)-2:4-hexadiene are most advantageously administered parenterally while others are most advantageously administered orally. For example, 3:4-bis-(3-methyl-4-hydroxyphenyl)-2:4-hexadiene when administered parenterally in 5 gamma doses will still produce 100% estrus in ovariectomized rats. The same doses are not nearly so effective when administered orally. On the other hand, 5 gamma of 3:4-bis-(3-methyl-4-propionyloxyphenyl) - hexane will produce 80% estrus when orally administered, but a much lesser discernable percentage when parenterally administered. The oestrogenic potency of the compounds of this invention may be readily appreciated when it is recognized that an oral administration of 50 gamma of oestrone only produces 70% estrus in rats treated according to standard procedure. The oestrogenic compounds of this invention are the only synthetic compounds, known to applicants, which are practically nontoxic and yet have high oestrogenic activity.

The dialkyl-dihydroxy-diphenyl-hexadiene, its hydrogenation products, and their esterification products disclosed but not claimed herein are claimed in copending continuation-in-part applications Serial Nos. 696,050, filed September 10, 1946; 716,883, filed December 17, 1946; and 716,884, filed December 17, 1946.

It will be understod that the embodiments of our invention described in the specification and in the examples are only illustrative of the compounds and the processes by which they are produced. Various modifications can be made without departing from the principles of the invention or the scope of the invention which is defined in the claim.

We claim:

A new article of manufacture, 3:4-bis-(3-methyl-4-hydroxyphenyl)-2:4-hexadiene.

ALBERT BLOOM.
VICTOR NIEDERL.

REFERENCES CITED

The following references are of record in the file of this patent:

UNITED STATES PATENTS

| Number | Name | Date |
|---|---|---|
| 2,350,718 | Bretschneider et al. | June 6, 1944 |

OTHER REFERENCES

Pallas, "Archiv fur Gynakologie," vol. 170 (1940), pp. 357–8.

Campbell, "Proceedings of the Royal Society" (London), vol. B129, pp. 528–38, 1940.

(I) Dodds et al., "Nature," June 13, 1936, p. 996.

(II) Dodds et al., "Nature," vol. 142 (1938), pp. 211–12.

Bernstein et al., "Journ. Am. Chem. Soc.," vol. 62, 1940, pp. 2872–3.